US009336209B1

(12) United States Patent
Gupta et al.

(10) Patent No.: US 9,336,209 B1
(45) Date of Patent: May 10, 2016

(54) COLLABORATIVE USE AND MANAGEMENT OF MODULAR APPLICATIONS

(71) Applicant: Google Inc., Mountain View, CA (US)

(72) Inventors: Saurabh Gupta, Millburn, NJ (US); Vance Julius Vagell, Kew Gardens, NJ (US); Mike Harm, New York, NY (US)

(73) Assignee: GOOGLE INC., Mountain View, CA (US)

( * ) Notice: Subject to any disclaimer, the term of this patent is extended or adjusted under 35 U.S.C. 154(b) by 173 days.

(21) Appl. No.: 14/089,350

(22) Filed: Nov. 25, 2013

(51) Int. Cl.
*G06F 7/00* (2006.01)
*G06F 17/00* (2006.01)
*G06F 17/30* (2006.01)

(52) U.S. Cl.
CPC .................................. *G06F 17/30011* (2013.01)

(58) Field of Classification Search
None
See application file for complete search history.

(56) References Cited

U.S. PATENT DOCUMENTS

| 8,200,953 | B1* | 6/2012 | Parsons | 713/2 |
| 2011/0035677 | A1* | 2/2011 | Vitale | G06Q 10/10 715/751 |
| 2011/0282968 | A1* | 11/2011 | Oliver | G06F 9/5072 709/217 |
| 2012/0297288 | A1* | 11/2012 | Mansouri | G06F 17/30893 715/234 |
| 2013/0124638 | A1* | 5/2013 | Barreto et al. | 709/205 |
| 2013/0185651 | A1* | 7/2013 | Wionzek et al. | 715/753 |
| 2013/0268302 | A1* | 10/2013 | Jayaram | 705/5 |
| 2013/0268480 | A1* | 10/2013 | Dorman | 707/608 |
| 2013/0304694 | A1* | 11/2013 | Barreto | G06F 17/30283 707/608 |
| 2013/0311894 | A1* | 11/2013 | Rexer et al. | 715/741 |

* cited by examiner

*Primary Examiner* — Tuan A Pham
(74) *Attorney, Agent, or Firm* — Ropes & Gray LLP

(57) ABSTRACT

A method for providing applications for use within collaborative documents includes storing, on a cloud computing service, a collaborative document accessible by a plurality of collaborators and a plurality of modular applications for a document editing application used by the plurality of collaborators to view the collaborative document, where the plurality of modular applications are usable within the collaborative document. The cloud computing service receives a request from a first collaborator in the plurality of collaborators to activate the use of a first modular application in the plurality of modular applications within the collaborative document, and activates the use of the first modular application within the collaborative document, where the first modular application executes on the cloud computing service and each of the plurality of collaborators may use the first modular application within the collaborative document.

12 Claims, 6 Drawing Sheets

COLLABORATIVE USE AND MANAGEMENT OF MODULAR APPLICATIONS

BACKGROUND

Cloud computing services allow users to create, edit, share, and collaborate on files that are stored on the cloud computing service. Users connect to the cloud computing service over a remote network such as the Internet. Files that may be stored on the cloud computing service include word processing documents, spreadsheets, presentations, images, audio files, video files, and many other types of documents and files. The cloud computing service also provides document editing applications for displaying and editing certain files. These applications are sent from the cloud computing service to a client computer and displayed on a web browser executing the client computer. For example, a cloud computing service may send to a client computer a document editing application for displaying and editing word processing documents stored on the cloud computing service. For collaborative documents, the cloud computing service sends the application to each collaborator so that they can view and edit the document at the same time.

The cloud computing service may allow users to install various add-on applications that increase the functionality of the document editing applications. These add-on applications, or modular applications, are designed to work in conjunction with the document editing applications. For example, a modular application may allow a user to create special types of charts in a spreadsheet document that cannot normally be created with the document editing application. However, the use of modular applications in collaborative documents is complicated. If one collaborator installs a modular application and uses it in a collaborative document, the other collaborators would also have to install the modular application to use it in the document as well. Also, installation of a modular application is tied to a particular device. A user has to install the modular application on each device that the user may use to edit the collaborative document.

SUMMARY

The systems and methods described herein provide ways to easily use and share modular applications between collaborators of a collaborative document stored on a cloud computing service. The modular applications are stored and executed on the cloud computing service rather than the client computer, which allows users to access and run the modular application from any device and allows the modular applications to be shared easily with collaborators. A cloud computing service stores a number of collaborative documents and a number of modular applications that may be used within the collaborative documents. The cloud computing service receives a request from a collaborator to activate the use of a modular application within a collaborative document. The cloud computing service activates the use of the modular application within the collaborative document, where the modular application executes on the cloud computing service and each collaborator of the collaborative document may use the modular application within the collaborative document. The cloud computing service allows all collaborators with requisite permission to activate or deactivate modular applications within the collaborative document that are shared by any one collaborator. In addition, the cloud computing service also allows a user to activate the modular application for use in all documents stored on the cloud computing service and owned by the user.

One aspect described herein discloses a method for providing applications for use within collaborative documents, the method including storing, on a cloud computing service, a collaborative document accessible by a plurality of collaborators, and storing on the cloud computing service a plurality of modular applications for a document editing application used by the plurality of collaborators to view the collaborative document, where the plurality of modular applications are usable within the collaborative document. The method further includes receiving a request from a first collaborator in the plurality of collaborators to activate the use of a first modular application in the plurality of modular applications within the collaborative document, and activating the use of the first modular application within the collaborative document, where the first modular application executes on the cloud computing service and each of the plurality of collaborators may use the first modular application within the collaborative document.

Another aspect described herein discloses an apparatus for providing applications for use within collaborative documents. The apparatus includes a server configured to communicate with a plurality of client computers, store a collaborative document accessible by a plurality of client computers, and store a plurality of modular applications for a document editing application that displays the collaborative document on each of the plurality of client computers, where the plurality of modular applications are usable within the collaborative document. The server is further configured to receive a request from a first client computer in the plurality of client computers to activate the use of a first modular application in the plurality of modular applications within the collaborative document, and activate the use of the first modular application within the collaborative document, where the first modular application executes on the server and users on each of the plurality of client computers may use the first modular application within the collaborative document.

Another aspect described herein discloses a user interface displayed on a client computer for providing applications for use within collaborative documents. The user interface includes an editing window for displaying a collaborative document stored on a cloud computing service, and an application menu displaying a plurality of modular applications stored on the cloud computing service, where when a first modular application in the plurality of modular applications is activated by a user the first modular application executes on the cloud computing service, and the user and each of a plurality of collaborators may use the first modular application within the collaborative document.

Another aspect described herein discloses a system for providing applications for use within collaborative documents, the system including a plurality of client computers and a server. The server is configured to communicate with the plurality of client computers, store a collaborative document accessible by a plurality of client computers, and store a plurality of modular applications for a document editing application that displays the collaborative document on each of the plurality of client computers, where the plurality of modular applications are usable within the collaborative document. The server is further configured to receive a request from a first client computer in the plurality of client computers to activate the use of a first modular application in the plurality of modular applications within the collaborative document, and activate the use of the first modular application within the collaborative document, where the first modular application executes on the server and users on each of the plurality of client computers may use the first modular application within the collaborative document.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to sharing modular applications between collaborators of a collaborative document stored on a cloud computing service. A cloud computing service stores a number of collaborative documents, each of which may be viewed and edited by multiple collaborators at the same time. The cloud computing service provides a document editing application to each collaborator, the document editing application executing as a stand-alone application or executing on a web browser on each collaborator's client computer. The cloud computing service also stores a number of modular applications that add functionality to the document editing application. A collaborator may browse and search for modular applications, and choose to activate a modular application within a collaborative document. When a modular application is activated, the modular application is executed on the cloud computing service and displayed to each collaborator. Each collaborator of the collaborative document may use the modular application within the collaborative document, regardless on who initially activated it. The cloud computing service allows all collaborators to activate or deactivate modular applications within the collaborative document that shared by any one collaborator. The cloud computing service also allows a user to activate the modular application for use in all or a select number of documents stored on the cloud computing service and accessible to the user.

Figure 1:
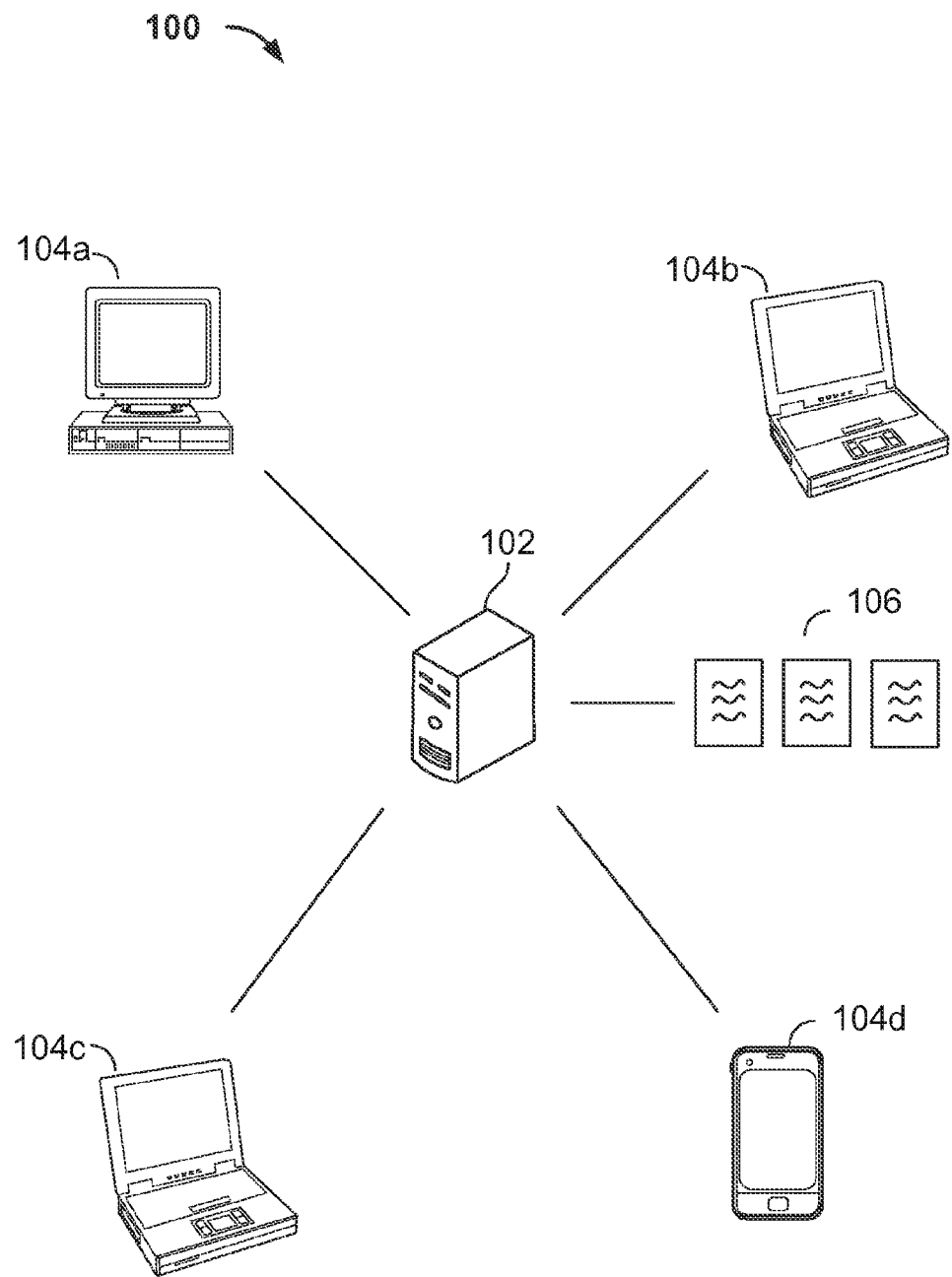
FIG. 1 shows a number of client computers in communication with a cloud computing service in accordance with an implementation as described herein.

First, a network system in which a number of client computers may connect to a server is described. FIG. 1 shows a network system 100 that includes cloud computing service 102 and a number of client computers 104a through 104d. Cloud computing service 102 may include one or more computing devices that collectively provide online content and services for a number of client computers. Cloud computing service stores a number of files 106 accessible by client computers 104a-104d. The files may include word processing documents, spreadsheets, presentations, images, audio files, video files, or any other files of various open or proprietary file types. Users may create, edit, copy, share, and delete files stored on the cloud computing service. Client computers 104a-104d may include desktop computers, laptop computers, tablets, smart phones, mobile electronic devices, or any other device that may connect to cloud computing service 102. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
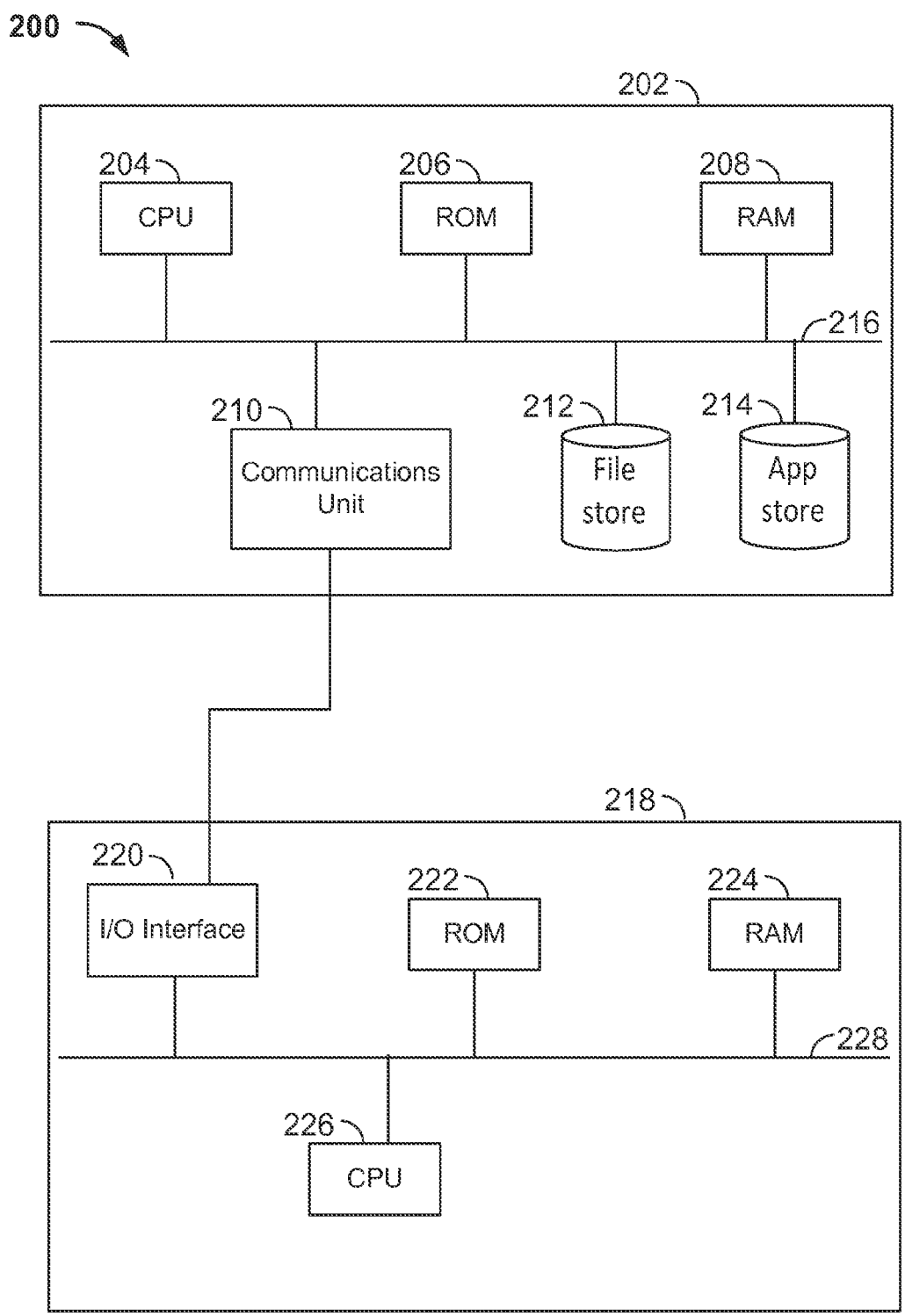
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 218. Cloud computing service 202 includes a central processing unit (CPU) 204, read-only memory (ROM) 206, random access memory (RAM) 208, communications unit 210, data store 212, application store 214, and bus 216. Server 202 may have additional components that are not illustrated in FIG. 2. Bus 216 allows the various components of server 202 to communicate with each other. Communications unit 210 allows server 202 to communicate with other devices, such as client computer 218 and other client computers. Data store 212 is used to store content accessible by a user on client computer 218, such as documents and files stored by users on cloud computing service 202. Application store 214 stores modular applications that are designed for use within the documents stored in data store 212. For example, application store 214 may store modular applications that are used in conjunction with document editing applications provided by cloud computing service 202 that allows users to edit documents on client computer 218. The modular applications are executed on cloud computing service 202 rather than installed and executed on client computer 218.

Client computer 218 includes a CPU 226, ROM 222, RAM 224, input/output interface 220, and bus 228. Client computer 218 may have additional components that are not illustrated in FIG. 2. Bus 228 allows the various components of client computer 218 to communicate with each other. Input/output interface 220 allows client computer 218 to communicate with other devices, such as cloud computing service 202. Input/output interface 220 also includes devices for taking in user inputs and displaying outputs to a user, such as a keyboard, mouse, and display screen. CPU 226 executes various programs and applications stored in memory on client computer 218, such as a web browser. Web browsers are used, among other things, to display content and services provided by cloud computing service 202. Web browsers receive web page documents encoded in HTML, CSS, Javascript, or other web-compatible languages and interpret the language to properly display the web page.

Data store 212 for storing content on cloud computing service 202, application store 214, a web browser executing on client computer 218, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

A cloud computing service stores documents accessible to a number of users. Each user can view, edit, and share the document with other users. A collaborative document is a document stored on a cloud computing service that is accessible to multiple users and may be edited by one or more users at the same time. A cloud computing service provides a platform for collaborators to work on collaborative documents. The cloud computing service provides document editing applications for viewing and editing documents stored on the cloud computing service. The document editing applications are sent from the cloud computing service to a client computer and run on a web browser or as a stand-alone application. The document editing applications include a user interface for displaying and editing the document. For example, if a user opens a word processing document stored on the cloud computing service, the cloud computing service sends a word processing document application to the web browser of the client computer. The word processing document application displays a user interface on the web browser for the user to view and edit the word processing document. The word processing document application may be implemented in HTML, Javascript, or any other browser-compatible language. Alternatively, the document editing application may be a stand-alone application that executes on the client computer, for example an "app" for a mobile device.

The cloud computing service may also store modular applications that work in conjunction with document editing applications and increase their functionality. These modular applications are provided by the cloud computing service and any user may install the modular applications and use them with and in documents stored on the cloud computing service. Examples of modular applications for use in conjunction with cloud-based document editing applications include mail merging applications, bibliography applications, chart and graph applications, plagiarism detection applications, document signature applications, facsimile applications, and applications that retrieve information from the Internet to display within the document. When activated within a document editing application, some modular applications may alter the user interface of the document editing application to provide added functionality, while other modular applications may execute certain computations or routines to display a result, while yet others may operate in the background and do not produce a visual change in the display of the document or document editing application. The modular applications may be developed by the cloud computing service or by third-party developers. The cloud computing service may provide an online web page or in-product gallery where users can browse, search, and install the modular applications. The user interface of the document editing applications also provides menu options to browse, search, and install modular applications. The modular applications may be provided for free, or some of them may be available for a fee.

Modular applications are normally installed on a client computer and may only be used on that particular device. If a user accesses the cloud computing service from another device, the user cannot use the modular application unless the user installs the modular application on the new device as well. In addition, when a collaborator of a collaborative document uses a modular application within a collaborative document, the other collaborators have to first install the modular application themselves before they can also take advantage of the added functionality. This makes the use and sharing of modular applications in a cloud computing service cumbersome and inconvenient.

The present systems and methods provide a more convenient way for users to use and share modular applications in a cloud computing environment. Instead of having the modular applications installed on the client computers, the execution of the modular applications is retained on the cloud computing service and the results are displayed to the user on the client computer. Thus a user may use the modular application from any client computer connected to the cloud computing service without first having to install the modular application on that client computer. Also, because the modular applications run on the cloud computing service, other collaborators may also use the modular applications without first having to install the modular applications. In addition, a user may choose to activate the modular application for use in certain documents but not in other documents.

The modular applications may be developed by the cloud computing service or by third-party developers and may be written in Javascript or another browser compatible language. For example, a modular application may be written as a script in Javascript that communicates with the application programming interface (API) of the document editing application and provides additional functionality to the application. The modular application may add additional user interface elements to the display, such as menu options, tabs, or sidebars. The cloud computing service initiates and executes a modular application when it receives a request from a user to activate the modular application within a collaborative document. The modular application communicates with the document editing application executing on the client computer to display the results of the modular application. The user interface displaying a collaborative document on the client computer provides ways for users to activate or deactivate modular applications within collaborative documents, as well as to search for additional modular applications to use within the collaborative document. When a user activates a modular application for use within the collaborative document, information identifying the user and the modular application is sent from the client computer to the cloud computing service and stored in the document metadata of the collaborative document. For example, each modular application has an application ID and each user has a user ID that is stored by the cloud computing service. Thus the document metadata stores information about all the modular applications that have been activated in a collaborative document, the collaborator who initially activated it, and whether each modular application is currently active or inactive within the document. The document metadata may also store licensing information associated with any modular applications that have been activated within the document. For example, modular applications that can only be used with a fee may have licensing restrictions associated with them. Information about activated modular applications may also be stored in the user metadata. The cloud computing service maintains the document and user metadata to track the activation status of modular applications for all documents and all users.

When a collaborator loads the document editing application and the collaborative document onto their client computer, the cloud computing service checks the document metadata of the collaborative document to determine which modular applications have been activated for the collaborative document. The cloud computing service executes the activated modular applications and incorporates the results into the display of the document editing application and collaborative document on the collaborator's client computer. For example, if a modular application adds a new menu option to the user interface of the document editing application, the new menu option appears in the user interface displayed to the collaborator. In another example, if a modular application inserts the current weather forecast within a collaborative document, the current weather forecast is inserted into the collaborative document displayed to the collaborator.

Figure 3:
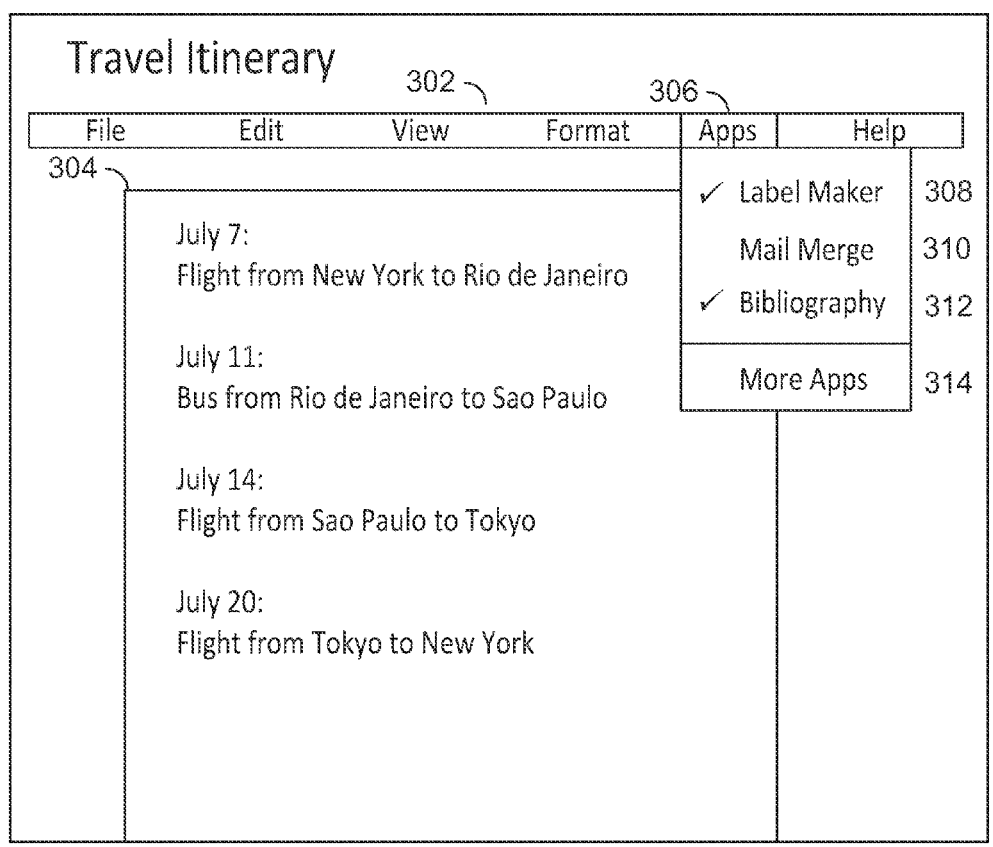
FIG. 3 shows a user interface for sharing modular applications in a collaborative document stored on a cloud computing service in accordance with an implementation as described herein.

FIG. 3 shows a user interface 300 for a document editing application provided by a cloud computing service. The document editing application and user interface 300 may be implemented in Javascript, Java, HTML, CSS, or any other browser-compatible language. The design and layout of user interface 300 is not limited to what is illustrated in FIG. 3. The cloud computing service sends the document editing application to the client computer, where it may be executed as a stand-alone application or executed within a web browser on the client computer, where it displays user interface 300 so that a user may view and edit collaborative document 304. User interface 300 also includes a menu bar 302 for providing various functions to the user, sorted into categories such as "File" and "Edit". For example, menu bar 302 may allow the user to save or share the file, copy and paste items on collaborative document 304, change the view of collaborative document 304, format the text or other graphics in collaborative document 304, and access help resources. Menu bar 302 may also include an "Apps" application menu 306 for a user to activate, deactivate, or search for modular applications to use within collaborative document 304. Application menu 306 may be labeled differently than as shown in FIG. 3, for example as "Tools", and may include additional options not shown in FIG. 3. Application menu 306 includes three modular applications available for use within collaborative document 304: Label Maker application 308, Mail Merge application 310, and Bibliography application 312. The check marks for Label Maker application 308 and Bibliography application 312 indicate that these applications are currently activated for use within collaborative document 304. Mail Merge application 310 is currently deactivated and not available for use within collaborative document 304. When a modular application is inactive, any collaborator may reactivate the use of the modular application. The modular applications displayed in menu 306 includes modular applications that the user has installed and active applications used by other collaborators of collaborative document 304. Menu 306 may also display all modular applications owned by collaborators, whether active or not. Alternatively, menu 306 may display modular applications owned by collaborators that are currently or had been active within collaborative document 304, but not modular applications owned by collaborators that have never been activated within collaborative document 304.

When a user selects a modular application shown in application menu 306, the selection acts as a toggle for the activation or deactivation of the modular application within collaborative document 304. For example, if a user selected Label Maker application 308, the application would be deactivated within collaborative document 304 and the check mark beside the name of the application would disappear.

Any user interface elements or content that Label Maker application 308 added to collaborative document 304 would disappear from view. Conversely, if a user selected Mail Merger application 310, the application would be activated for use within collaborative document 304 and a check mark would appear beside the name of the application. Any user interface elements or content that Mail Merge application 310 adds to collaborative document 304 would appear on the display screen. Any collaborator that has access to collaborative document 304 may view, activate, or deactivate the modular applications listed in application menu 306, regardless of whether that collaborator was the one that initially activated the modular application within the document. For example, one collaborator may have activated Label Maker application 308 for use in collaborative document 304 and another collaborator may choose to deactivate it. This allows each collaborator to control all modular applications that other collaborators have activated within the document. When a user chooses to use a modular application activated by a collaborator for the first time, user interface 300 may display a screen requesting consent from the user to allow the modular application permission to certain user data. The document metadata stores an access control list which determines the access permissions of each collaborator, such as "view", "comment", "edit", and "owner". In some instances, the activation or deactivation of modular applications may be restricted to collaborators with certain access permissions, such as owner or editor.

Figure 4:
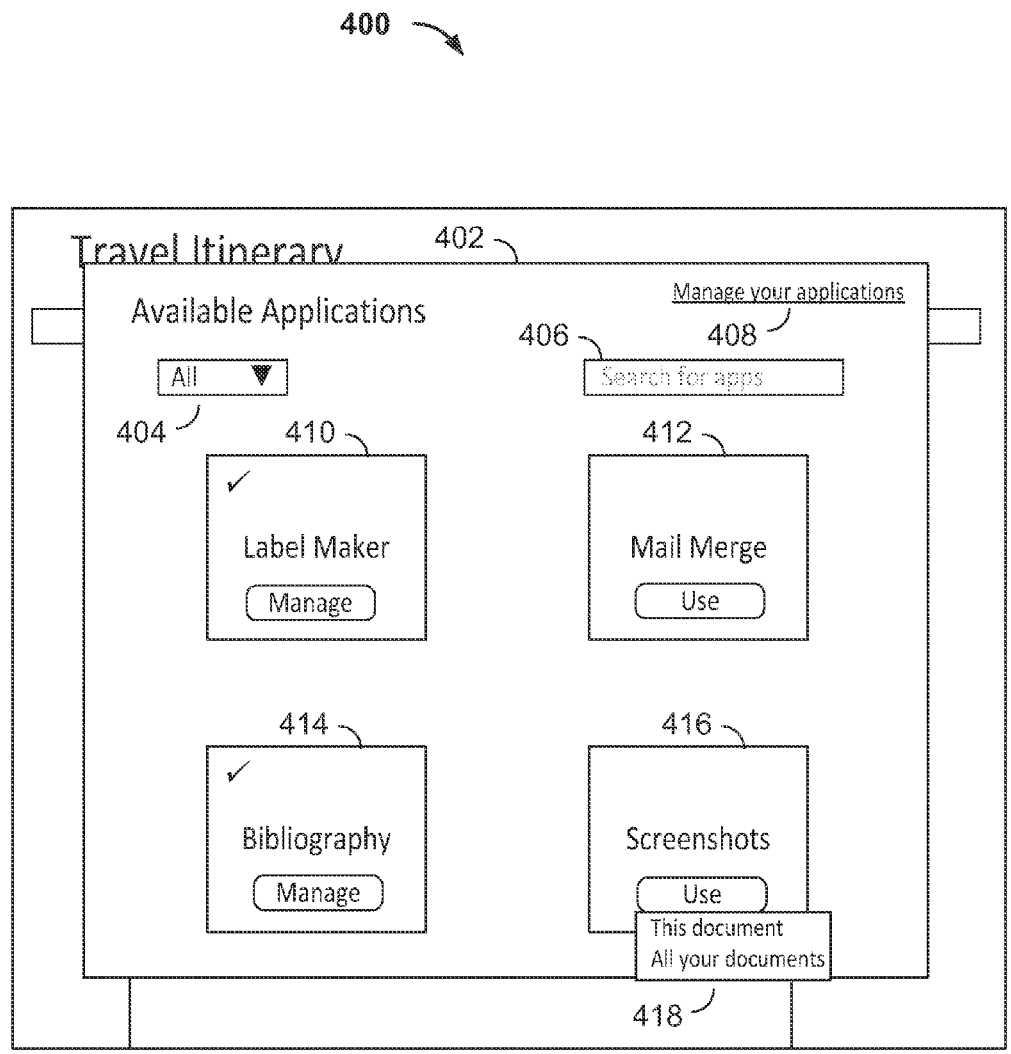
FIG. 4 shows another user interface for sharing modular applications in a collaborative document stored on a cloud computing service in accordance with an implementation as described herein.

Application menu 306 also includes a "More Apps" option 314 for searching or browsing for modular applications to use within collaborative document 304. When a user selects option 314, user interface 300 presents another interface for a user to browse and search for modular applications. FIG. 4 shows user interface 400 that is displayed by the document editing application when a user selects the "More Apps" option 314 in FIG. 3. An application browsing window 402 appears on top of the display of the collaborative document. Application browsing window 402 may overlay the display of the collaborative document or may be displayed in a separate window. Application browsing window 402 may be implemented in Javascript or any other browser compatible language. The design and layout of application browsing window 402 is not limited to what is shown in FIG. 4. Application browsing window 402 includes one or more drop-down menus such as drop-down menu 404 for sorting and filtering available modular applications provided by the cloud computing service. For example, modular applications may be filtered based on category, identity of developer, rating, the date of release, or which document editing applications the modular applications may work with. Application browsing window 402 also includes one or more search fields 406 for users to search for particular modular applications. Application browsing window 402 may also include a link 408 to manage modular applications that the user has activated.

Application browsing window 402 also displays icons for one or more modular applications stored on the cloud computing service and available for use within the collaborative document. The displayed modular applications may be based on selections made by the user in drop-down menu 404 or searches the user has entered in search field 406. FIG. 4 shows icons for four modular applications: Label Maker application 410, Mail Merge application 412, Bibliography application 414, and Screenshots application 416. Check marks are shown on icons for Label Maker application 410 and Bibliography application 414 to indicate that the user has already activated that application in one or more collaborative documents stored by the cloud computing service. The icons for modular applications that the user already has activated within one or more documents may include a "Manage" button for managing the use of the modular applications. The "Manage" button is discussed in further detail in relation to FIG. 5. For modular applications that the user has never activated before, a "Use" button may appear on the icon of the application. When the "Use" button is highlighted or selected by the user, sub-menu 418 may appear. Sub-menu 418 gives the user the option to either use the modular application only in the current collaborative document that the user is viewing (represented by the option "This document"), or to use the modular application in all documents owned by the user (represented by the option "All your documents"). The second option activates the modular application in documents owned by the user, as opposed to documents accessible to the user that are owned by a collaborator and shared with the user. This allows users to selectively choose which documents the modular application may run on. For example, if a user has access to two collaborative documents, each with a different group of collaborators, a user may want one group to use a particular modular application but may not want the other group to use the modular application. When a user chooses to "use" or activate the modular application, application browsing window 402 may display a confirmation screen confirming that the modular application is activated, and may also present a warning screen to inform the users of possible access permissions that the modular application has over the user's cloud computing account.

Figure 5:
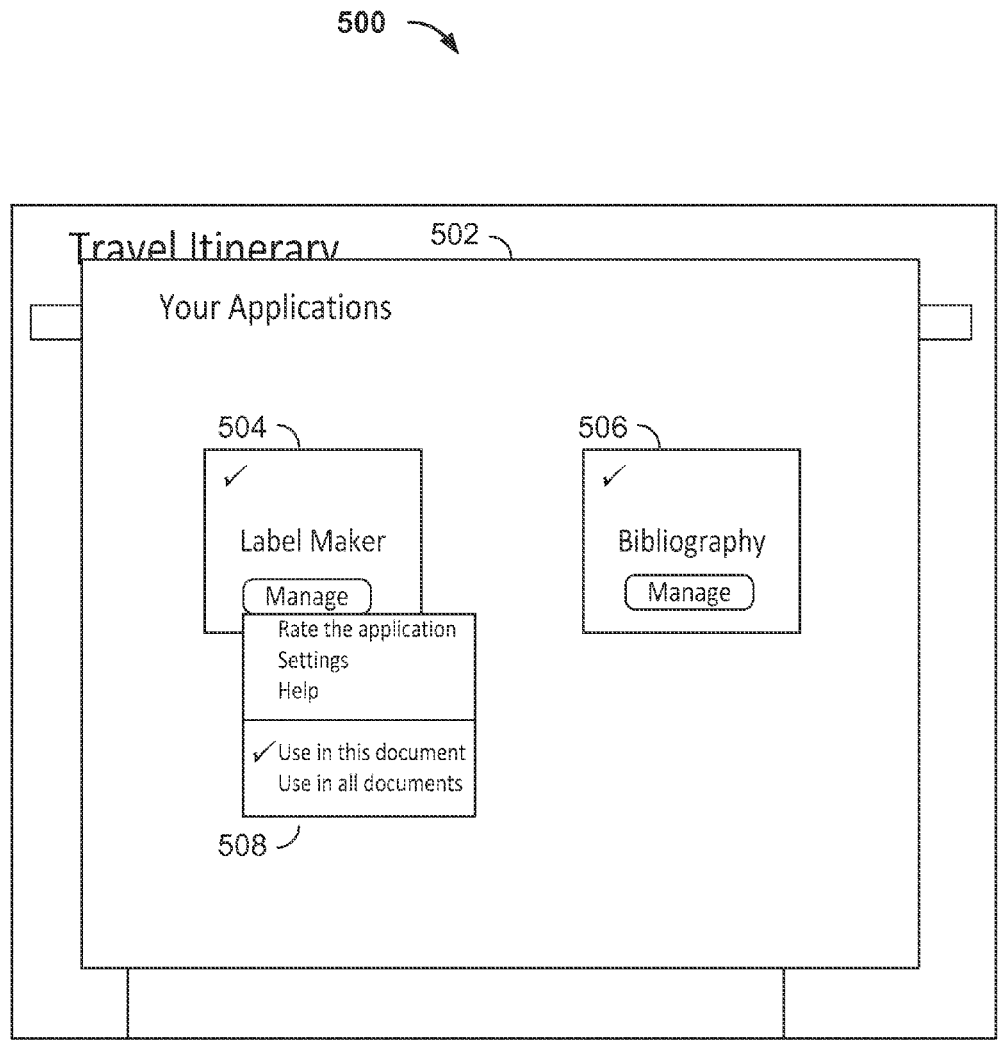
FIG. 5 shows another user interface for sharing modular applications in a collaborative document stored on a cloud computing service in accordance with an implementation as described herein.

When a user selects the "Manage your applications" link 408 in application browsing window 402, the document editing application displays another window for managing modular applications that the user has already activated in one or more documents. FIG. 4 shows a user interface 500 that is displayed by the document editing application when a user selects the "Manage your applications" link 408 in FIG. 4. An application manager window 502 appears on top of the display of the collaborative document. Application manager window 502 may overlay the display of the collaborative document or may be displayed in a separate window. Application manager window 502 may be implemented in Javascript or any other browser compatible language. The design and layout of application manager window 502 is not limited to what is shown in FIG. 5. Application manager window 502 includes icons representing modular applications that the user has activated in one or more documents stored on the cloud computing service that are accessible to the user. For example, Label Maker application 504 and Bibliography application 506 are displayed in application manager window 502, but Mail Merge application 412 and Screenshots application 416 shown in FIG. 4 do not appear in application manager window 502 because the user has never activated the modular applications before.

Each modular application icon in application manager window 502 includes a "Manage" button that, when highlighted or selected by a user, shows a menu 508 for managing the modular application. Menu 508 may include, among other things, options to use a modular application in a particular document or to use the modular application in all documents owned by the user. The current option selected may be indicated with a check mark. Menu 508 may include options to rate the modular application, options to adjust settings on the modular application, options to obtain help resources for the modular application, and other options not illustrated in FIG. 5.

FIGS. 3-5 show that a user viewing a collaborative document on a client computer may access and manage modular applications through the user interface provided by the cloud computing service. However, the cloud computing service may also provide an independent web page that allows users to browse and search for modular applications provided by the cloud computing service. This web page may be an online "store" or other type of software retail web page that users navigate. When a user chooses to activate a modular application through a web page, the web page may request that the user present their log-in credentials for the cloud computing service. This allows the cloud computing service to associate the modular application with the user and update the relevant metadata.

A user may also choose to "uninstall" a modular application that the user has previously activated in one or more documents stored on the cloud computing service. This is not a true uninstall because the modular application was never installed on any of the user's client computers. If the user never activated the modular application in any documents that collaborators could access, then the modular application is removed from the display of application menu 306 shown in FIG. 3. That is, the user will no longer have the option to activate or deactivate the modular application in any of the user's documents. If the user has activated the modular application in a collaborative document, the modular application may also be removed from the display of application menu 306 shown in FIG. 3, or may remain in display so that collaborators can opt to reactivate it. Any other collaborator that has independently activated the modular application may reactivate the modular application within the collaborative document.

Figure 6:
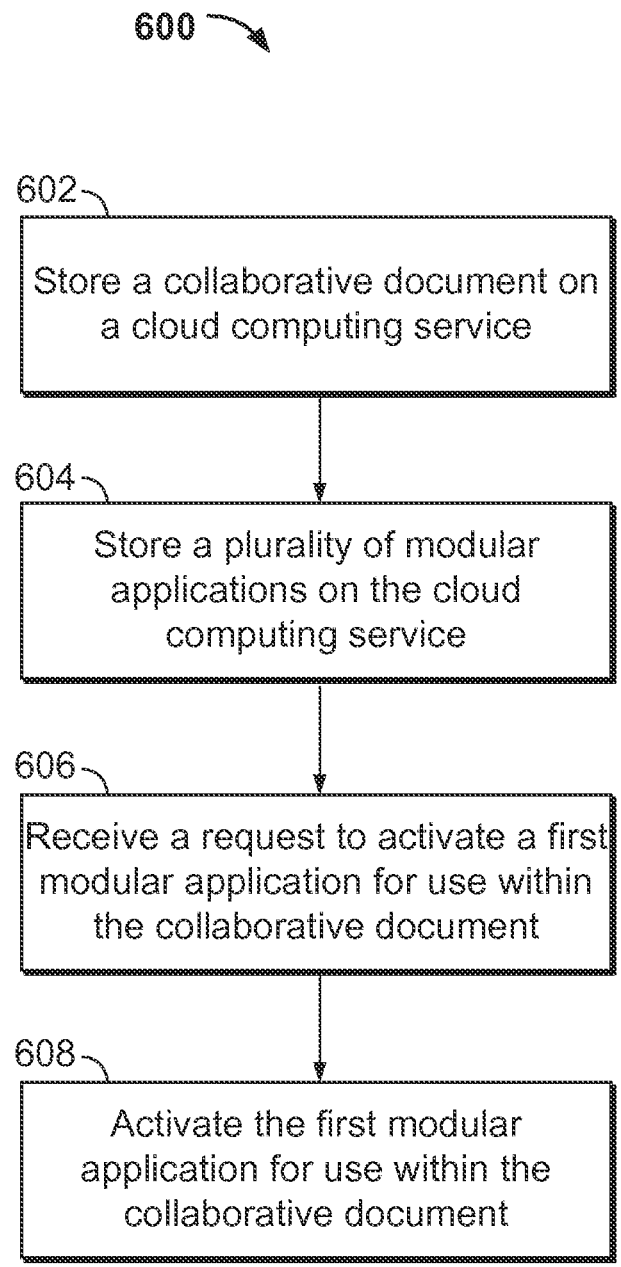
FIG. 6 shows a method for providing applications for use within collaborative documents in accordance with an implementation as described herein.

Methods are now discussed for providing collaborators the ability to use and share modular applications within collaborative documents stored on a cloud computing service. FIG. 6 illustrates a method 600 for providing applications for use within collaborative documents. Method 600 includes storing, on a cloud computing service, a collaborative document accessible by a plurality of collaborators and storing on the cloud computing service a plurality of modular applications for a document editing application used by the plurality of collaborators to view the collaborative document, where the plurality of modular applications are usable within the collaborative document. The method further includes receiving a request from a first collaborator in the plurality of collaborators to activate the use of a first modular application in the plurality of modular applications within the collaborative document, and activating the use of the first modular application within the collaborative document, where the first modular application executes on the cloud computing service and each of the plurality of collaborators may use the first modular application within the collaborative document. Method 600 may be performed on one or more servers that collectively provide a cloud computing service, such as cloud computing service 102 in FIG. 1 or cloud computing service 202 in FIG. 2.

Method 600 begins when a cloud computing service stores a collaborative document accessible by a plurality of collaborators, shown at 602. The collaborative document may be a word processing document, spreadsheet, presentation, or any other document that may be edited by multiple users at the same time. When a collaborator on a client computer requests access to the collaborative document, the cloud computing service authenticates the collaborator and sends a copy of the collaborative document and a document editing application to run on the client computer, either as a stand-alone application or within a web browser of the client computer. The document editing application includes a user interface for the collaborator to view and edit the collaborative document. The cloud computing service manages any changes made to the collaborative document by the collaborator and propagates those changes to any other collaborators who are concurrently viewing the document. The collaborative document may have an access control list stored in its metadata that stores which collaborators have access to the document and their level of access (view, comment, write, edit, owner, etc.).

The cloud computing service also stores a plurality of modular applications for a document editing application used by the plurality of collaborators to view the collaborative document, where the plurality of modular applications are usable within the collaborative document, shown at 604. These modular applications are designed to work in conjunction with the document editing application to add more functionality to the document editing application. Examples of modular applications for use within the collaborative document include mail merging applications, bibliography applications, chart and graph applications, plagiarism detection applications, document signature applications, facsimile applications, and applications that retrieve information from the Internet to display within the document. The modular applications may be written in Javascript and use the API of the document editing application to add functionality and additional user interface elements. The modular applications may be developed by the cloud computing service or by third-party developers. The modular applications are available for any user to use within a document stored on the cloud computing service, and may be free or available for a fee. The user interface of the document editing application has menu options for collaborators to activate, deactivate, search, and browse for the modular applications, such as user interface 300 in FIG. 3. The cloud computing service may also provide an independent web page for users to browse and search for the modular applications.

The cloud computing service receives a request from a collaborator of the collaborative document to activate the use of a modular application within the collaborative document, shown at 606. The request may be generated from a user action on the user interface of the document editing application. For example, the user interface may have an application menu that displays one or more modular applications that may be activated within the collaborative document, or a menu option to browse for modular applications and activate modular applications within the collaborative document. FIGS. 3 and 4 show user interfaces capable of allowing collaborators to request activation of a modular application. The document editing application receives the user input and sends a request to the cloud computing service to activate the modular application in the collaborative document. The request may include the application ID, the ID of the collaborator making the request, and the document ID.

After the cloud computing service receives the request to activate the modular application, the cloud computing service activates the use of the modular application within the collaborative document, shown at 608. The cloud computing service updates the document metadata with the application ID of the modular application being activated and the ID of the collaborator that made the request. The cloud computing service updates the document editing application to display the modular application in the application menu of the user interface as an activated modular application. The cloud computing service then initiates the execution of the modular application on the cloud computing service. The user interface on each collaborator's client computers is updated with the results of the execution of the modular application, such as updates to user interface elements and content. An example flow chart for the process of activating a modular application is shown below:

1. Receive request to activate modular application within collaborative document from user on client computer.
2. Retrieve application ID and user ID from the request.
3. Add the application ID and user ID to the document metadata of the collaborative document.
4. Add the activated modular application to the application menu displayed on the client computer.
5. Execute the modular application on the cloud computing service.
6. Send the results of the execution to the client computer and any other collaborators that are concurrently editing the collaborative document.

Thus the modular application is not installed and executed on each client computer but rather is executed on the cloud computing service and the results delivered to each client computer for display. The user interface of the document editing application executing on each client computer allows any collaborator to activate or deactivate any modular application that any other collaborator has added to the collaborative document. Any collaborator may also add additional modular applications to the collaborative documents. Also, a collaborator may choose to activate the modular application in a particular collaborative document or may activate the modular application in all the documents owned by the collaborator on the cloud computing service. Thus, method 600 provides a way for collaborators of a collaborative document to use and share modular applications within the collaborative document.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing applications for use within collaborative documents, the method comprising:
   storing, on a cloud computing service, a collaborative document accessible by a plurality of collaborators;
   storing on the cloud computing service a plurality of modular applications accessible from within the collaborative document of a document editing application used by the plurality of collaborators to view the collaborative document, wherein the plurality of modular applications are usable within the collaborative document;
   receiving a request from a first collaborator in the plurality of collaborators to activate the use of a first modular application in the plurality of modular applications from within the collaborative document wherein, the first collaborator uses a client computer to connect to the cloud computing service and the document editing application executes on the client computer and wherein, the request to activate the first modular application is sent to the cloud computing service from the document editing application upon a user-initiated action;

activating the use of the first modular application within the collaborative document, wherein the first modular application executes on the cloud computing service and each of the plurality of collaborators may use the first modular application within the collaborative document wherein, the first modular application communicates with the collaborative document to increase the functionality of the document editing application used to access the collaborative document;

receiving a request from one of the plurality of collaborators to deactivate the use of the first modular application from within the collaborative document; and deactivating the use of the first modular application within the collaborative document, wherein each of the plurality of collaborators may reactivate the use of the first modular application from within the collaborative document.

2. The method of claim 1, the method further comprising:
receiving a request from the first collaborator to activate the use of the first modular application within a set of all documents stored on the cloud computing service and owned by the first collaborator; and
activating the use of the first modular application within the set of all documents.

3. The method of claim 1, wherein the first modular application interacts with the document editing application through an application programming interface.

4. The method of claim 1, wherein metadata of the collaborative document stores information identifying the first modular application and information identifying the first collaborator.

5. The method of claim 1, wherein the request includes information identifying the first modular application and information identifying the first collaborator.

6. An apparatus for providing applications for use within collaborative documents, the apparatus comprising:
a computer processor;
a server to:
communicate with a plurality of client computers;
store a collaborative document in memory accessible by a plurality of client computers;
store a plurality of modular applications accessible from within the collaborative document of a document editing application that displays the collaborative document on each of the plurality of client computers, wherein the plurality of modular applications are usable within the collaborative document;
receive a request from a first client computer in the plurality of client computers to activate the use of a first modular application in the plurality of modular applications from within the collaborative document wherein, the first collaborator uses a client computer to connect to the cloud computing service and the document editing application executes on the client computer and wherein, the request to activate the first modular application is sent to the cloud computing service from the document editing application upon a user-initiated action;

activate the use of the first modular application within the collaborative document, wherein the first modular application executes on the server and users on each of the plurality of client computers may use the first modular application within the collaborative document wherein, the first modular application communicates with the collaborative document to increase the functionality of the document editing application used to access the collaborative document;

receive a request from one of the plurality of collaborators to deactivate the use of the first modular application from within the collaborative document; and deactivate the use of the first modular application within the collaborative document, wherein each of the plurality of collaborators may reactivate the use of the first modular application from within the collaborative document.

7. The apparatus of claim 6, the server further configured to:
receive a request from the first client computer to activate the use of the first modular application within a set of all documents stored on the server and owned by the first client computer; and
activate the use of the first modular application within the set of all documents.

8. The apparatus of claim 6, the server further configured to provide the document editing application to each of the plurality of client computers to display the collaborative document.

9. The apparatus of claim 8, wherein the document editing application executes on each of the plurality of the client computers.

10. The apparatus of claim 6, wherein the first modular application interacts with the document editing application through an application programming interface.

11. The apparatus of claim 6, wherein metadata of the collaborative document stores information identifying the first modular application and information identifying the first collaborator.

12. The apparatus of claim 6, wherein the request includes information identifying the first modular application and information identifying the first collaborator.

* * * * *